United States Patent
Willey

(10) Patent No.: US 8,023,969 B2
(45) Date of Patent: Sep. 20, 2011

(54) APPARATUS, AND ASSOCIATED METHOD, FOR CONFIGURING A PAGE MESSAGE INCLUDING A SET STRUCTURE OF PARTIAL IDENTIFIERS USED TO PAGE AN ACCESS TERMINAL IN A RADIO COMMUNICATION SYSTEM PURSUANT TO A PARTIAL IDENTITY COMPARISON SCHEME

(75) Inventor: William Daniel Willey, Gilroy, CA (US)

(73) Assignee: Reseach In Motion Limited, Waterloo (CA)

( * ) Notice: Subject to any disclaimer, the term of this patent is extended or adjusted under 35 U.S.C. 154(b) by 1050 days.

(21) Appl. No.: 11/849,583

(22) Filed: Sep. 4, 2007

(65) Prior Publication Data
US 2008/0057980 A1 Mar. 6, 2008

Related U.S. Application Data

(60) Provisional application No. 60/824,554, filed on Sep. 5, 2006.

(51) Int. Cl.
*H04W 68/00* (2009.01)

(52) U.S. Cl. ............... 455/458; 455/412.2; 455/515; 455/574; 455/422.1

(58) Field of Classification Search .......... 455/458, 455/412.2, 515, 574, 422.1
See application file for complete search history.

(56) References Cited

U.S. PATENT DOCUMENTS

| 2006/0285485 A1* | 12/2006 | Agrawal et al. | 370/208 |
| 2007/0015523 A1* | 1/2007 | Prakash et al. | 455/458 |
| 2007/0254679 A1* | 11/2007 | Montojo et al. | 455/458 |

* cited by examiner

*Primary Examiner* — Kwasi Karikari

(57) ABSTRACT

Apparatus, and an associated method, for facilitating paging of an access terminal operable in a radio communication system. A paging message is formed, selectably including partial identities of access terminals that are to be paged by the paging message. Determination is made as to whether portions of any of the partial identities have portions of common values. If portions of the partial identities have common values, such portions can be shared, and extra parts, resulting from sharing can be reallocated to increase the length of another partial identity.

18 Claims, 3 Drawing Sheets

APPARATUS, AND ASSOCIATED METHOD, FOR CONFIGURING A PAGE MESSAGE INCLUDING A SET STRUCTURE OF PARTIAL IDENTIFIERS USED TO PAGE AN ACCESS TERMINAL IN A RADIO COMMUNICATION SYSTEM PURSUANT TO A PARTIAL IDENTITY COMPARISON SCHEME

CROSS REFERENCE TO RELATED APPLICATIONS

The present invention claims the priority of provisional patent application No., 60/824,554, filed on Sep. 5, 2006, the contents of which are incorporated herein by reference.

The present invention relates generally to a manner by which to page an access terminal of a radio communication system to alert the access terminal of a pending call, or other communication. More particularly, the present invention relates to an apparatus, and an associated method, by which to form a quick page message that is of a set structure, selectably free of redundant values.

When quick paging is performed using a partial identity comparison, the structure is set so that the pages included in the quick page message are of configurations and lengths best to minimize the occurrence of false wakeup of an access terminal. Excessive battery depletion as a result of false wakeup of the access terminal is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also providing the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard, defines a quick paging channel (QPCH) upon which access-terminal pages are broadcast by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH.

In one configuration, the quick page message contains quick page indicators. The quick page message includes a number of quick page indicator slots populated with the quick page indicators that indicate whether an access terminal is being paged. An exemplary configuration of a scheme that utilizes page indications is set forth, for instance, in industry contribution 3GPP2 C20-20060731-033. In this configuration, during operation, a mobile station hashes to a quick page indicator location, i.e., slot, within the quick page message based upon a session seed, i.e., a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In another configuration, a partial hash comparison scheme is provided. In the disclosed partial hash comparison scheme, the access network forms a quick page message in which a portion of a hash of an access terminal identifier (ATI) of an access terminal that is paged is placed in the quick page message. An access terminal that monitors for the delivery of a quick page message, reads the content of the message and compares the values with corresponding values, that is, portions of a hash of the identifier of that access terminal. If the values do not match, then the access terminal enters into a reduced power state, e.g., a sleep state.

The QPCH message, as presently-proposed, provides thirty-five page indication locations, i.e., bits available to be populated with paging indicators. The aforementioned "partial hash comparison" scheme utilizes three of the thirty-five page indication locations for identifying the number of pages, and the remaining page indication locations are available for paging, viz., are available. While the proposed, partial hash comparison scheme reduces the false wakeup probability when paging load is relatively low, when the paging load increases, the reduction in the available page indication locations actually increases the possibility of false wakeup. When more than five access terminals are paged, partial hash comparison is not used due to this increased possibility. Instead, hashing to page indication locations is performed.

If a manner could be provided by which to improve the performance of a scheme that utilizes partial comparison pursuant to paging by better reducing the possibility of false wakeup, improved battery longevity of the access terminal would be possible.

It is in light of this background information related to paging by an access network of an access terminal that the significant improvements of the present invention have evolved.

DETAILED DESCRIPTION

Figure 1:
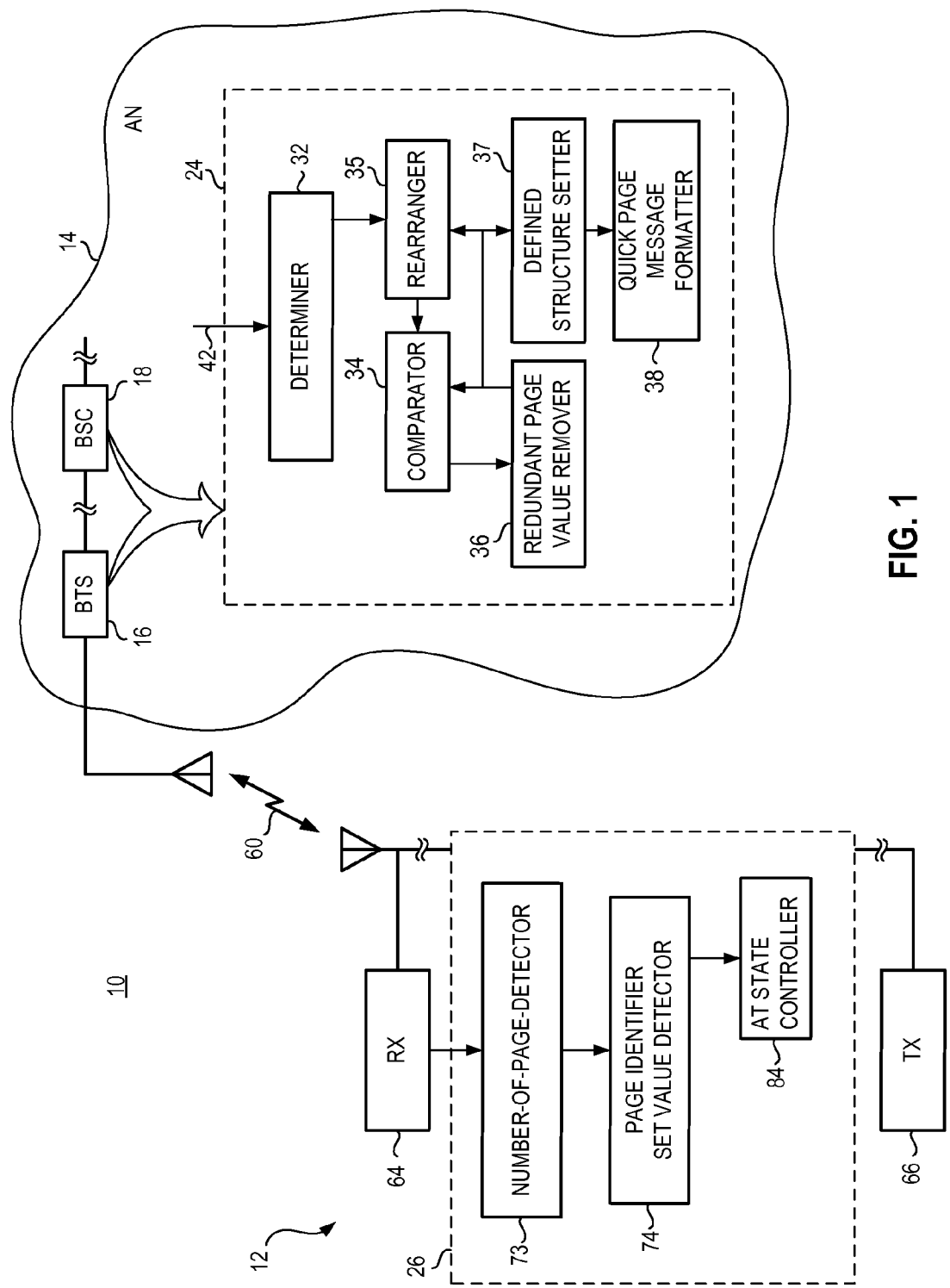
FIG. 1 illustrates a functional block diagram of a radio communication system in which an embodiment of the present invention is operable.

The present invention, accordingly, advantageously provides apparatus, and an associated method, by which to page an access terminal of a radio communication system to alert the access terminal of a pending call, or other communication.

Through operation of an embodiment of the present invention, a manner is provided by which to form a quick page message that is selectably free of redundant values.

Improved quick paging is provided that lessens the likelihood of false wakeup of an access terminal, thereby improving the longevity of the battery that powers the access terminal. Pursuant to operation, when quick paging is performed using a partial identity comparison, the pages included in the quick page message are of configurations and lengths best to minimize the occurrence of false wakeup of the access terminal.

In another aspect of the present invention, a partial identity scheme is utilized in the quick paging procedure. The partial identity comparison utilizes parts of access terminal identifiers (ATIs) or other numbers that are associated with access terminals that are paged. The portion of the ATI, or other number, that is included in the quick page message comprises, for instance, a selected number of most significant bits of the number. The length of the portion of the number included in the quick page message is dependent upon one or more factors.

As the length of the quick page message is prescribed, e.g., is of a thirty-five bit length, the lengths of the parts of the ATIs or other numbers included in the quick page message are limited by this prescribed length. If multiple pages are contained in the quick page message, only fractional portions of the parts of the ATIs or other numbers are able to be included in the quick page message. When the number of pages increase, the size, i.e., lengths, of the parts of the numbers that are includable in the quick page message are reduced.

A first portion of the quick page message, such as a first, three-bit portion, identifies the number of pages in the message. If the quick page message is of a length of thirty-five bits, and, e.g., the number of page indications is three-bits in length, then the number of bits available to identify the access terminals is reduced to thirty-two of the thirty-five bits. When a single access terminal is paged, all thirty-two bits are available by which to identify the paged access terminal. When two access terminals are paged, half of the thirty-two available bits are available to identify each of the two access terminals being paged. Analogously, when three access terminals are paged, one-third of the thirty-two bits are available to identify each of the three access terminals being paged. Because three does not divide into thirty-two equally, the number of bits available to identify different ones of the three access terminals is dissimilar. Or, one or more bits are not utilized to identify the paged access terminals. Analogous divisions and distributions are provided for higher numbers of paged access terminals.

In another aspect of the present invention, a determination is first made of the number of pages that are to be included in the quick page message. And, the corresponding parts of ATIs or other numbers that are used to identify the paged access terminals are configured. The most significant bits, for instance, of the number known to both the access terminal and the access network are used. For example, parts of the ATIs are utilized. For example, if sixteen bits are available to identify an access terminal, such as when the quick page message is to page two access terminals, the sixteen most significant bits of the number are utilized. If preferred, least significant bits are instead utilized. A comparator compares the values that identify the access terminals. In the event that the values identifying the different access terminals that are to be paged correspond, then redundant values are deleted by a redundant page value remover. The bits that would otherwise need to be provided for population with the redundant values are able, instead, to be utilized for other purposes.

In a further aspect of the present invention, all of the bit locations of the quick page message available to identify access terminals are used. The number of bits available to identify each access terminal need not be equal. For instance, if three access terminals are to be paged in the quick page message, two of the terminals are identified with ten bit values while a third of the access terminals is identified with an eleven bit-length value. Through use of all of the available parts of the quick page message, false wakeup of an access terminal is proportionately less likely to occur.

In these and other aspects, therefore, an apparatus and an associated method is provided for an access network of a communication network that generates a first page message on a first paging channel. A determiner is configured to determine page values of each page identifier set of each page intended to be included in the first page message. A redundant page value remover is configured selectably to remove page values intended to be included in the first page message that are redundant to page values of another page identifier set, if any, also intended to be part of the first page message. The first page message is formed of page value sets selectably free of page value set redundancies.

In these and further aspects, an apparatus and an associated method is provided for an access terminal that monitors a first paging channel for delivery of a first paging message. A number-of-pages detector is configured to detect how many page identifier sets are included in the first paging message. A page identifier set value detector is configured to detect values of each page identifier set detected by the number-of-pages detector to be included in the first paging message. The first paging message is selectably free of page value set redundancies.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal 12 and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, access terminals are alerted, by broadcast of a page message when a communication, initiated at the network, is to be terminated at an access terminal. A quick paging channel (QPCH), or analogous channel, is defined. Information contained in a quick page message broadcast on the quick paging channel identifies access terminals that are paged. When an access terminal detects, from the quick page message, that the access terminal is paged, the access terminal further operates in anticipation of the page and subsequent communication. The access terminal, conversely, enters into a reduced-power consumption state, e.g., a sleep state if the access terminal does not detect that it is being paged. If the access terminal incorrectly determines that it is being paged, the access terminal falsely wakes up. And, increased levels of power are consumed by the access terminal, resulting in reduced battery longevity. The aforementioned partial hash comparison scheme is intended to reduce the likelihood of false wakeup of the access terminal, but, as presently implemented, provides advantages only when a quick page message pages five or fewer access terminals. Additionally, not all of the bits of a quick page message are fully utilized in every paging scenario, and the existing scheme, for this reason, is less than ideal.

Accordingly, pursuant to an embodiment of the present invention, the access network includes apparatus 24, and the access terminal includes apparatus 26, that operate pursuant to quick page message generation and quick page message receipt in manners that reduce the likelihood of occurrence of false wakeup relative to an existing partial hash comparison scheme. The elements of the apparatus 24 and of the apparatus 26 are functionally represented, implementable in any desired manner, including, for instance, by algorithms executable by processing circuitry.

The elements forming the apparatus 24 are implemented at any appropriate location of the access network, including, as illustrated, at the BTS 16 or BSC 18, or distributed amongst such entities, as well as others.

Here, the apparatus 24 includes a determiner 32, a comparator 34, a rearranger 35, a redundant page value remover 36, a set structure definer 37, and a quick page message formatter 38.

The determiner 32 operates to determine page values of page identifier sets that are associated with access terminals that are to be paged in a quick page message. That is to say, the determiner is provided, here indicated by way of the lines 42, with the identities, such as by their ATIs, of the access terminals that are to be paged. The number of terminals that are paged is determinative of the lengths of the page identifier sets that are includable in the quick page message. When more pages are to be included in the page message, the lengths of the page identifier sets that identify each of the access terminals being paged are less than the lengths permitted when fewer numbers of access terminals are being paged. Most significant bits, e.g., or other bits of the ATIs are used. And, the determiner determines the parts of the ATIs that can be used, depending upon the number of pages to be included in the quick page message. For example, if two pages are to be included in the quick page message, each page identifier set is of sixteen-bit lengths, the sixteen most significant bits of the ATIs. When numbers other than ATIs are used, analogous portions of such other numbers are, e.g., instead utilized. In the exemplary implementation in which thirty-two bits are available in which to identify the access terminals and three bits are used to identify the number of pages in the quick page message, the thirty-two bits are collectively available to be used to identify access terminals that are to be paged. Pursuant to a further embodiment of the present invention, in the event that the number of access terminals that are to be paged do not permit for an equal division of the thirty-two bits, unequal numbers of bits are allocated to identify different ones of the access terminals while fully utilizing all thirty-two available bits. For instance, when three access terminals are to be paged, one access terminal is identified with an eleven-bit length page identifier set while the other two access terminals are identified with ten-bit length page identifier sets.

Indications of the identifiers determined by the determiner are provided to a rearranger 35. The rearranger rearranges bit lengths of one or more of the partial identifier sets to increase the likelihood of occurrence of redundancy of partial identifier and provides the sets, once rearranged, to a comparator 34. The comparator 34 operates to compare the different values and to identify if any of the page identifier sets are of identical values. When parts of the ATIs are utilized, that is to say, the selected number of most significant bits of the ATIs of the access terminals that are to be paged are used, there is a possibility that the most significant bits identifying more than one access terminal are identical to the corresponding values that identify another access terminal. Operation of the comparator identifies such identical values.

Indications of comparisons made by the comparator are provided to the redundant page value remover 36. The redundant page value remover removes values, that is to say, page identifier set bits, that are redundant, freeing up bit space in the quick page message. In the exemplary implementation, upon removal of the redundant bit values, the determiner is caused to redetermine the page values of the identifiers of the access terminals that are to be paged. And the set structure definer 37 defines a set structure to be used in the quick page message. Set structures, and their contents, are provided by the determiner to the redundant page value remover and thereafter provided to the quick page message formatter 38. The quick page message formatter forms the quick page message populated with page identifier sets that are selectably free of redundancies through the removal of the redundant page value remover 36, comparator 34, and determiner 32.

Transceiver elements of the base transceiver station 16 cause broadcast of quick page messages that have been formatted by the quick page message formatter. The messages are broadcast upon a radio air interface, represented in FIG. 1 by the arrow 62. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number-of-pages detector 72 and a page identifier set value detector 74. The elements are functionally represented, also implementable in any desired manner, including algorithms executable by processing circuitry. The detector 72 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector of the page value lengths of the page identifier set or sets contained in the quick page message. In the event that the detector detects the access terminal is not to be paged, an indication is provided to an access terminal (AT) state controller 84 to cause the access terminal to be placed in a reduced-power state, e.g., a sleep mode. If a page is detected, conversely, an indication is provided to the state controller and the controller causes the state of the access terminal to permit its further operation with respect to paging and further communication.

While the existing partial hash comparison scheme is used only when five or fewer access terminals are paged, operation of an embodiment of the present invention is potentially permitting of performance of a partial identity comparison scheme in the event that more than five access terminals are being paged, but one or more of the identifiers, that is, page identifier sets are identical. For example, if seven access terminals are being paged and three of the access terminals being paged have the same six bits as their most significant bits, the apparatus 24 operates to eliminate two of the three duplicates page identifier sets and is then able to include five six-bit page identifier sets, herein also referred to as hashes, using partial identity comparison. Otherwise, individual page indication bits are inserted in specified locations of the message, their locations being selected through operation of a hash function generator.

Figure 2:
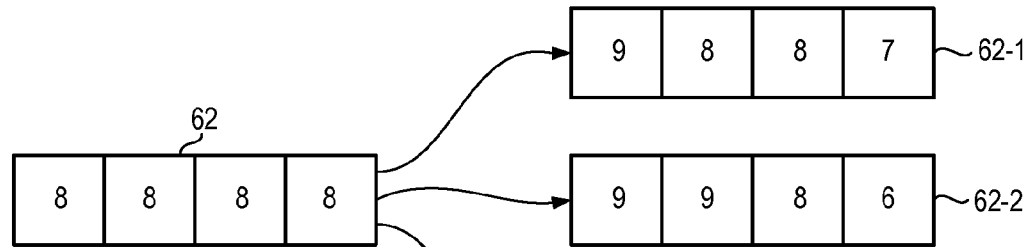
FIG. 2 illustrates a representation of exemplary structures formable pursuant to operation of an embodiment of the present invention.

FIG. 2 illustrates an exemplary representation of operation of rearrangement, such as that performed by the rearranger 35 shown in FIG. 1. Here, the structure, represented at 62 of a quick page message, such as that determined by the determiner 32 shown in FIG. 1, includes four partial identifiers, each of eight-bit lengths. Rearrangement performed by the rearranger creates any of various alternate structures of which structures 62-1, 62-2, and 62-3 are shown. The structure 62-1 is of bit lengths of nine-bit, eight-bit, eight-bit, and seven-bit lengths, respectively. The structure 62-2 includes partial identifiers of bit-lengths of nine bits, nine bits, eight bits, and six bits, respectively. And, the structure 62-3 is formed of partial identifiers of nine-bit, nine-bit, nine-bit, and five-bit lengths, respectively.

Figure 3:
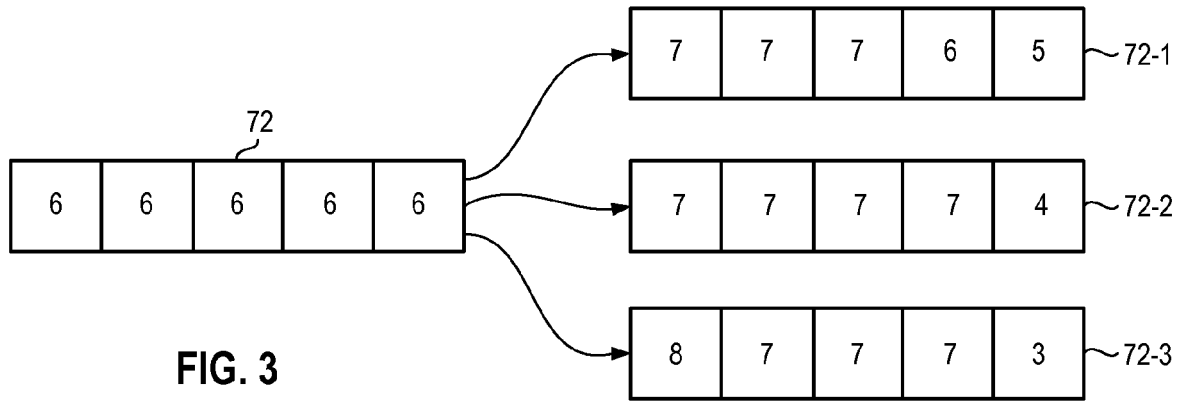
FIG. 3 illustrates a representation similar to that shown in FIG. 2, but of other exemplary structures formable during operation of one embodiment of the present invention.

FIG. 3 illustrates other exemplary structures formable pursuant to operation of an embodiment of the present invention. Here, a structure initially formed includes partial identifiers of five access terminals. Initially, each of the partial identifiers is of a six-bit length. Rearrangement operations form any of various alternate structures, of which three alternate structures, designated as 72-1, 72-2, and 72-3 are shown in the figure. The structure 72-1 includes partial identifiers of seven-bit, seven-bit, seven-bit, six-bit, and five-bit lengths, respectively. The structure 72-2 is formed of partial identifiers of seven-bit, seven-bit, seven-bit, and four-bit lengths, respectively. And, the structure 72-3 is formed of partial identifiers of eight-bit, seven-bit, seven-bit, seven-bit, and three-bit lengths, respectively.

The false wakeup probability at an access terminal is governed by the equation:

$$1-[1\text{“}\tfrac{1}{2}\text{”}^n]$$

Wherein:
n identifies the number, i.e., bit length, of partial identifiers.
Through operation of an embodiment of the present invention, new structures are provided that, when used, reduce the likelihood of occurrence of false wakeup. FIGS. 2 and 3 illustrate various of the new structures when four and five identifiers are to be paged within a quick page message. During operation of an embodiment of the present invention, the number of bits for one of the partial identifiers is lowered in order to give a higher probability of a match of, viz., redundancy with, another partial identifier. In an example of five pages within a quick page message, there is a fifty-one percent possibility of occurrence of at least two five-bit partial identifiers being a match. Analogously, there is a twenty-eight percent probability of match of six-bit partial identifiers, a fifteen percent probability of redundancy of at least two seven-bit partial identifiers, and an eight percent probability of redundancy of at least two eight-bit partial identifiers. Structures are used if the likelihood of false wakeup for the structure is less than the likelihood of false wakeup when a hashing to individual page indication locations and use of single-bit identifiers are used.

The false wakeup probability for the structure 62-1 shown in FIG. 2 is governed by the following equation:

$$1-\left(1-\frac{1}{2^9}\right)\left(1-\frac{1}{2^8}\right)^2\left(1-\frac{1}{2^7}\right)$$

The false wakeup probability for the structure 62-2 shown in FIG. 2 is:

$$1-\left(1-\frac{1}{2^9}\right)^2\left(1-\frac{1}{2^8}\right)\left(1-\frac{1}{2^6}\right)$$

The structure that exhibits the lowest false wakeup probability and that generates a partial identifier that can be eliminated, if any, is the structure used by the access network. The overall false wakeup probability for a number of pages is determinable by summing the products of the various false wakeup probabilities for the new structure and the percentage of page combinations that would use them together with the product of the false wakeup probability of a page indication method for the number of pages and the percentage of page combinations where matches are unable to be made.

Figure 4:
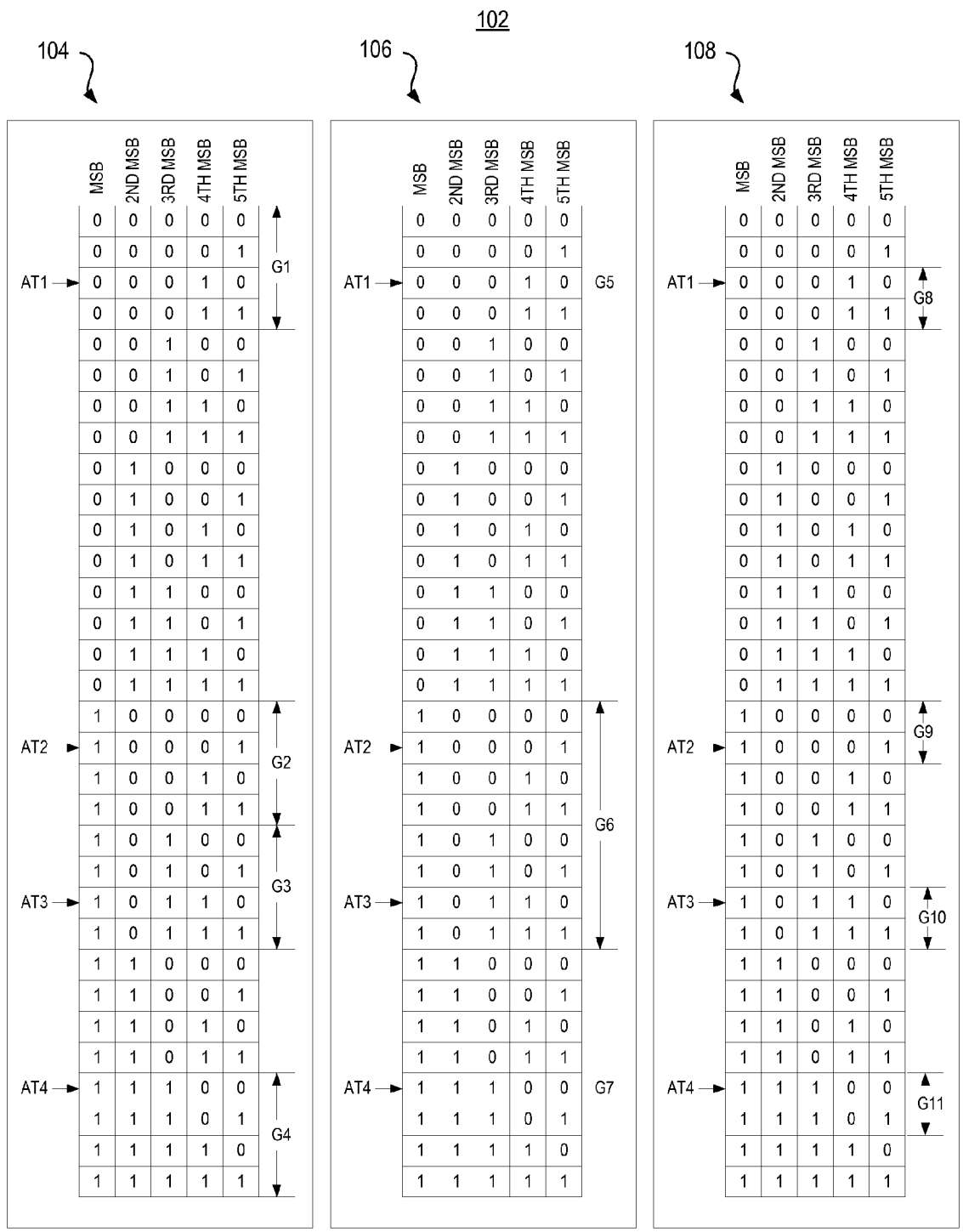
FIG. 4 illustrates a representation of exemplary paging, and occurrence of partial wakeup, pursuant to various paging schemes, including the paging scheme using a set structure pursuant to an embodiment of the present invention.

FIG. 4 illustrates a group, shown generally at 102, of partial identifiers that identify access terminals and occurrences of false wakeup of various of such access terminals pursuant to various quick paging schemes. Here, representations of three paging schemes are shown at 104, 106, and 108. The first paging scheme is representative of a conventional partial comparison scheme in which partial identifiers contained in a paging message are all of equal-numbered bit lengths. The scheme 106 is representative of a scheme in which partial redundancies are removed to lessen the likelihood of false wakeup. And, the scheme 108 is representative of the scheme of an embodiment of the present invention in which set structures are utilized to minimize the occurrence of false wakeup.

The exemplary operations shown by the schemes 104, 106, and 108 are of operation in which a quick page message includes twelve bits available by which to identify all of the access terminals that are paged. Operation with respect to a quick page message that includes other numbers of available bits, such as the thirty-two bits described above, is analogous.

Additionally, in the examples of FIG. 4, four access terminals, access terminals AT1, AT2, AT3, and AT4, are paged. And, each grouping 104, 106, and 108 illustrates the five most significant bits (MSBs) of an identifier amenable to identify any of the access terminals. And, as indicated by the four access terminals, AT1, AT2, AT3, and AT4, the access terminal AT1 has as its most five significant partial identity bits of '00010'. Analogously, the access terminal AT2 is identified by its five most significant bits of '10001'. The access terminal AT3 has as its five most significant bits '10110'. And, the access terminal AT4 has as its five most significant bits the values '11100'.

In the example in which twelve bits are available in the quick page message and four access terminals are paged, the scheme of grouping 104 forms a quick page message in which three bits are available to each of the four access terminals, that is to say, twelve divided by four. In such a structure, the bits would be: '000', '100', '101', and '111'. Such values correspond to the most significant bits, the three most significant bits, the access terminals AT1, AT2, AT3, and AT4, respectively. Groups identified as G1, G2, G3, and G4 identify access terminals that are awakened by the quick page. Sixteen of the access terminals are awakened, not merely the access terminals that are being paged.

The scheme represented by the grouping 106 reduces the occurrence of false wakeup relative to the scheme represented by the grouping 104. In this example, the four pages to the four access terminals are represented by three partial identities. One of the partial identities is chosen such that two of the partial identities will be of the same values, that is, be redundant. In this example, the access terminals AT2 and AT3 have the same most significant two partial identity bits while both the access terminals AT1 and AT4 differ more significantly in their respective most significant partial identity bits. Therefore, a structure here is used that allows the access terminals AT2 and AT3 to share two bits. The structure of the quick page message includes a first page of five bits, a second page of five bits, and a third page of two bits. And, the bits in the structure are of values in '00010', '11100', and '10', corresponding to the access terminals AT1, AT4, and AT2/AT3, respectively.

Here, the groups G5, G6, and G7 are the groups of access terminals that are awakened by the quick page message. Groups G5 and G7 include only the access terminals AT1 and AT4, respectively. And, the group G6 includes values associated with eight access terminals. Comparison of the groupings 104 and 106 illustrates the improvement provided by the selection of the unequal bit lengths of the pages contained in the quick page message.

The grouping 108 represents paging in which a page message is formed of set structures. The structure is here used to match a smallest number of partial identities with various numbers of pages. For example, a '552' structure is used, if desired, to page four access terminals if the most significant two partial identity bits of two access terminals are the same. The same '552' structure is also usable to page five access terminals if the most significant two partial identity bits of the three access terminals are the same. In various scenarios, the added flexibility of being able to use a structure for additional numbers of pages does not necessarily provide substantial additional benefit. Through the use of set structures, the flexibility is lost, but, as illustrated in the example, further decrease in the likelihood of false wakeup. By way of an example, a '44211' quick paging structure is used to represent the exemplary four pages of which two of the partial identifiers share the most significant two partial identity bits. This same structure would not be used, however, in an example of five pages of which three access terminals share common values of their two most significant partial identity bits. In this '44211' structure, the values are: '0001', '1110', '10', '0', and '1'. The values '0001' correspond to the four most significant bits of the access terminal AT1. The values '1110' correspond to the four most significant bits of the partial identifier of the access terminal AT4. The values '10' correspond to the values of the two most significant bits of the partial identifiers of the access terminals AT2 and AT3. And, the remaining bits, i.e., '0' and '1', represent less significant bits of the access terminals AT2 and AT3. It should be noted that a '543' structure is also available and this structure would instead be used in the event of matches on the three most significant bits of two of the access terminals.

By the selection of the example, therefore, an assumption can be made that the access terminals AT2 and AT3 have third most significant bits of different values. Therefore, the first bit following the two-bit partial identifier set in the '44211' set structure is assumed to be associated with the access terminal that has '0' as its third most significant bit. Analogously, the last bit in the '44211' structure is assumed to be associated with the access terminal that has the page value of '1' as its third most significant bit. Therefore, the '0' in the structure corresponds to the fourth most significant bit of the second access terminal, and the value in '1' in the set structure corresponds to the fourth most significant bit of the third access terminal.

The groups G8, G9, G10, and G11 illustrate the groups of access terminals that are awakened by the quick page message of the aforementioned set structure. Here, a lessened number of access terminals are falsely awakened. Comparison of the access terminals awakened by the examples of the grouping 108 with the groupings 106 and 104 illustrates the further reduction in the false wakeup. Additional note is made pertaining to the '543' structure briefly noted above. The set structure is not used, for example, if the number of possible structures is limited and the second-to-last and the last bits in the structure represent the third most significant bit of the access terminal AT2 and the third most significant bit of the access terminal AT3, respectively.

In this example, in the event that the '543' set structure is available, the effect of the new structure is to specify four bits of each of the four access terminals even though only twelve bits are available. Two bits are duplicated for the two access terminals and two bits are implied. The effect is to compress the sixteen bits of the four access terminals into twelve bits. Even though an uneven number of bits is sent in the set structure for each of the four access terminals, in effect, four bits are represented for each access terminal. Preferably, an even number of bits is represented for each access terminal.

In the example of the '543' structure, if a '444' structure is available, the fourth most significant bits of the access terminals that match the three most significant bits are implied in the same way as described above for the fourth most significant bits.

Figure 5:
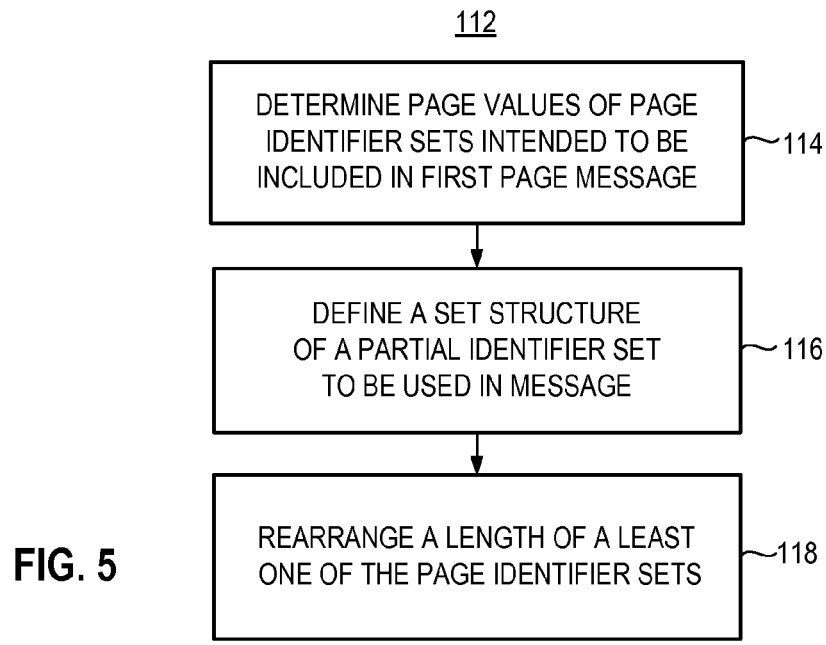
FIG. 5 illustrates a method flow diagram listing the method of operation of an embodiment of the present invention.

FIG. 5 illustrates a method, shown generally at 112, representative of the method of operation of an embodiment of the present invention. The method facilitates paging by an access network that selectably generates a first page message on a first paging channel.

First, and as indicated by the block 114, page values of each page identifier set of each page intended to be included in the first page message are determined. Then, and as indicated by the block 116, a set structure of partial identifier sets is defined to be included in the first paging message.

Then, and as indicated by the block 118, a length of at least one of the page identifier sets of pages intended to be included in the first page message are rearranged. Rearrangement is made in a manner that facilitates reduction in a probability parameter.

The previous descriptions are of preferred examples for implementing the invention, and the scope of the invention should not necessarily be limited by this description. The scope of the present invention is defined by the following claims.

What is claimed is:

1. A method for forming an access-terminal paging message, said method comprising:
   structuring the access-terminal paging message to include a common portion that is common to both a first identity and to a second identity and at least a portion of a third identity, wherein the common portion is of a length less than or equal to half that of the portion of the third identity; and
   conveying at least one additional identifier bit of the first identity.

2. The method of claim 1 wherein the at least one additional identifier bit comprises an explicit bit.

3. The method of claim 1 wherein the at least one additional identifier bit comprises an implicit bit.

4. The method of claim 1 wherein the at least one additional identifier bit comprises a plurality of additional identifier bits.

5. The method of claim 4 wherein the plurality of additional identifier bits comprises at least a first identifier bit associated with the first identity and a second identifier bit associated with the second identity.

6. The method of claim 1 wherein the third identity comprises a plurality of identities.

7. The method of claim 1 wherein the access-terminal paging message includes a single instance of the common portion.

8. An apparatus for forming an access-terminal paging message, said apparatus comprising:
   a message formatter configured to structure the access-terminal paging message to include a common portion that is common to both a first identity and a second identity and at least a portion of a third identity, wherein the common portion is of a length less than or equal to half that of the portion of the third identity; and
   an additional bit conveyor configured to convey at least one additional identifier bit of the first identity.

9. The apparatus of claim 8 wherein the at least the third identity comprises a plurality of identities.

10. The apparatus of claim 8 wherein the at least one additional identifier bit comprises an implicit bit.

11. The apparatus of claim 8 wherein the at least one additional identifier bit comprises an explicit bit.

12. The apparatus of claim 11 wherein the explicit bit is associated with one of the first identity and the second identity.

13. A method for facilitating paging of an access terminal, said method comprising:
   detecting delivery at the access terminal of a paging message, the paging message structured to include a common portion that identifies both a first identity and a second identity and at least a portion of a third identity, the length of the portion of the third identity being greater than or equal to twice the length of the common portion, and the paging message further conveying an additional identifier bit of the first identity; and
   deciding whether an identity of the access terminal matches a conveyed partial identity of the paging message.

14. The method of claim 13 wherein the additional identifier bit comprises an implicit bit.

15. The method of claim 13 wherein the additional identifier bit comprises an explicit bit.

16. An apparatus for facilitating paging of an access terminal, said apparatus comprising:
   a detector configured to detect delivery at the access terminal of a paging message structured to include a common portion that identifies both a first identity and a second identity and at least a portion of a third identity, the length of the portion of the third identity being greater than or equal to twice the length of the common portion, the paging message further conveying an additional identifier bit of the first identity; and
   a decider configured to decide whether an identity of the access terminal matches a conveyed partial identity of the paging message.

17. The apparatus of claim 16 wherein the additional identifier bit comprises an implicit bit.

18. The apparatus of claim 16 wherein the additional identifier bit comprises an explicit bit.

* * * * *